United States Patent [19]
Sugiura et al.

[11] 3,820,004
[45] June 25, 1974

[54] DIRECT CURRENT VOLTAGE SUPPLY APPARATUS

[75] Inventors: Akio Sugiura, Nagoya; Atsutoshi Okomoto, Toyohashi, both of Japan

[73] Assignee: Nippondenso Co., Ltd., Kariya-shi, Aichi-Ken, Japan

[22] Filed: Jan. 29, 1973

[21] Appl. No.: 327,389

[30] Foreign Application Priority Data
Feb. 2, 1972 Japan.............................. 47-14004
Feb. 4, 1972 Japan.............................. 47-15096
Mar. 8, 1972 Japan.............................. 47-28235
Apr. 11, 1972 Japan.............................. 47-43207

[52] U.S. Cl.................................. 321/15, 307/110
[51] Int. Cl........................................ H02m 7/00
[58] Field of Search.............. 307/109, 110; 321/15

[56] References Cited
UNITED STATES PATENTS
3,106,672   10/1963   Mills.............................. 321/15 X OTHER PUBLICATIONS
Designer's Casebook, "Capacitors Add Up In Voltage Multiplier," H. R. Mallory, Electronics, Mar. 2, 1970, p. 104.

Primary Examiner—William M. Shoop, Jr.
Attorney, Agent, or Firm—Cushman, Darby & Cushman

[57] ABSTRACT

A dc voltage supply apparatus comprising a dc power supply, a semiconductor switching circuit connected to the dc power supply, a first-capacitor charging circuit including a first capacitor and a first rectifying element and connected to the semiconductor switching circuit, a circuit including the first capacitor, a second capacitor and a second rectifying element and connected to the semiconductor switching circuit for discharging the first capacitor and charging the second capacitor, an output terminal connected to one end of the second capacitor, and a current limiter provided in at least one of the charging circuit and the charging and discharging circuit.

1 Claim, 6 Drawing Figures

DIRECT CURRENT VOLTAGE SUPPLY APPARATUS

BACKGROUND OF THE INVENTION

1. Field of the Invention

This invention relates to a dc voltage supply apparatus using a single dc power source and generating a dc voltage having a reversed polarity to a power source voltage and/or a dc voltage twice as large as the dc voltage of said power source.

2. Description of the Prior Art

In a conventional dc voltage supply apparatus for generating a reversed dc voltage to a source voltage, such a system is employed in which charge stored in a first capacitor is allowed to discharge through a switching element to thereby charge up a second capacitor.

In this case, since the discharging current from said first capacitor is not controlled, there arise such drawbacks that an excess discharging current is allowed to flow, so that it brings an overload for the switching element, and further a spike voltage is superimposed on the output dc voltage of the reversed polarity obtained across the second capacitor and gives adverse effects on other electronic devices.

In a conventional dc voltage supply apparatus for generating a doubled dc voltage, there was used means utilizing an inverter, etc. However, a transformer is required therein which is extremely disadvantageous for the recent purpose of miniaturization of electronic devices utilizing integrated circuits.

SUMMARY OF THE INVENTION

An object of this invention is to provide a dc voltage supply apparatus comprising a current limiting element provided in a discharging circuit of a first capacitor, which circuit is so arranged as to charge up a second capacitor located outside a charging circuit of the first capacitor, thereby limiting the magnitude of the discharging current of said first capacitor to give no adverse effects on an output voltage and to thereby prevent adverse effects on the switching element of a transistor etc. and the generation of a spike voltage.

Another object of this invention is to provide a dc voltage supply apparatus not using a transformer and capable of providing a doubled voltage from a single dc voltage source.

In the circuit of a dc voltage supply apparatus according to this invention, a current limiting element is connected, outside the charging circuit of the first capacitor, but in the discharging circuit of the first capacitor formed to charge up the second capacitor, thereby to limit the discharging current of said first capacitor to a certain appropriate value. Thus, since no excess current is allowed to flow through a switching element in said discharging circuit, the load for said switching element becomes extremely low, the generation of a spike current is prevented and the influences of the load variation become small. Therefore, a dc voltage of the opposite polarity to that of the source voltage can be effectively provided across said second capacitor and further the circuit design becomes easy.

Further, the dc voltage supply apparatus according to this invention has an advantage that since no elements of large dimension are used, a voltage twice as large as the source voltage can be obtained at the output terminal with an extremely small and simple circuit structure. Further, since linear IC's of low power consumption have been developed in recent years, the present voltage supply apparatus becomes most effective when used in combination with these linear IC's.

BRIEF DESCRIPTION OF THE DRAWINGS

In the drawings, like reference numerals refer to like parts.

DESCRIPTION OF THE PREFERRED EMBODIMENTS

Now, the embodiments of this invention will be described referring to the accompanying drawings. First, the first embodiment of this invention will be described referring to FIG. 1.

Figure 1:
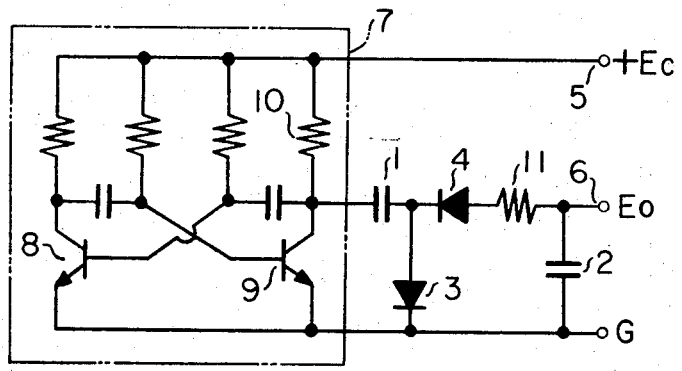
FIG. 1 is an electrical connection diagram of the first embodiment of the dc voltage supply apparatus according to this invention.

In FIG. 1, numeral 1 denotes a first capacitor having a capacitance $C_1$, 2 a second capacitor having a capacitance $C_2$, 3 a first diode, 4 a second diode, 5 a positive terminal of a dc voltage source, 6 a negative terminal of said dc voltage source, G a common terminal, 7 an astable multivibrator, 8 and 9 a pair of transistors, 10 a load resistor for said transistor 9, and 11 a resistor connected between the second diode 4 and the second capacitor 2.

Next, the operation of the present device of the above structure will be described. When the astable multivibrator 7 begins self-oscillation, a square wave voltage having a peak value $E_C$ equal to the source voltage is generated at the collector of the transistor 9. When said transistor 9 is cut off and the collector voltage increases from zero to $E_C$, a current is allowed to flow through a series circuit formed of the resistor 10, the first capacitor 1, and the first diode 3 and a charge of $C_1 \cdot E_C$ is stored in said first capacitor 1. Next, when said transistor 9 becomes conductive and the collector voltage becomes zero, there is formed a series circuit consisting of the first capacitor 1, the collector-emitter of the transistor 9, the second capacitor 2, the resistor 11 and the second diode 4, i.e., a discharging circuit for said first capacitor 1 is formed through the second capacitor 2. The discharging current can be limited by selecting an appropriate value for the resistor 11. At this moment, further, a voltage of $(C_1/C_1 + C_2) \cdot E_C$ is generated across the second capacitor 2 with the output terminal 6 having the reversed polarity, i.e., the negative polarity, to that of the source terminal 5. Thus, between the output terminal 6 and the terminal G is obtained a negative voltage having the opposite polarity to that of the voltage between the source terminal 5 and the terminal G. }

Figure 2:
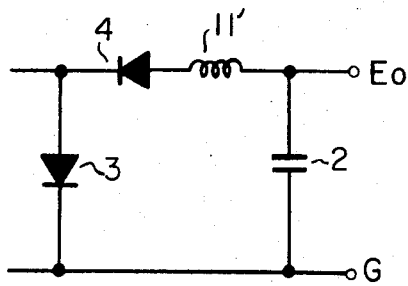
FIG. 2 is an electrical connection diagram of another embodiment of the discharging circuit of the dc voltage supply apparatus according to this invention.

Here, an inductance element 11' as shown in FIG. 2 can be used as the impedance element in place of the resistance element 11.

Next, the second embodiment of this invention will be described referring to FIG. 3, in which numeral 111 denotes a transistor and 112 a bias resistor for said transistor 111. The emitter-collector of said transistor 111 is connected between the first and the second capacitors 1 and 2.

Next, the operation of this embodiment will be described. When the astable multivibrator 7 begins the self-oscillation, a square wave voltage having a peak value $E_C$ equal to that of the source voltage is generated at the collector of the transistor 9. When said transistor 9 is cut off and the collector voltage increases from zero to $E_C$, a current is allowed to flow through a series circuit formed of the resistor 10, the first capacitor 1, and the first diode 3 and a charge of $C_1 \cdot E_C$ is stored in said first capacitor 1. At this moment, the transistor 111 is cut off. Next, when said transistor 9 becomes conductive and the collector voltage becomes zero, a current is supplied through the resistor 112 to the base of the transistor 111 to let the transistor 111 become conductive. Then, a closed circuit is formed of the first capacitor 1, the collector-emitter of the transistor 9, the second capacitor 2 and the collector-emitter of the transistor 111. Namely, a discharging circuit for said first capacitor 1 is formed through the second capacitor 2, and a voltage of $(C_1/C_1 + C_2) \cdot E_C$ is generated across said second capacitor with the output terminal 6 having the negative polarity which is the opposite polarity to that of the source terminal 5. Thus, between the output terminal 6 and the terminal G, is obtained a negative voltage of the opposite polarity to that of the voltage applied between the source terminal 5 and the terminal G. Further, the discharging current of the first capacitor 1 becomes constant by the base current of the transistor 111 which is determined by the resistor 112. The resistance of the resistor 112 is selected to be of an appropriate value so as to restrain the magnitude of the discharging current to a predetermined value.

Figure 4:
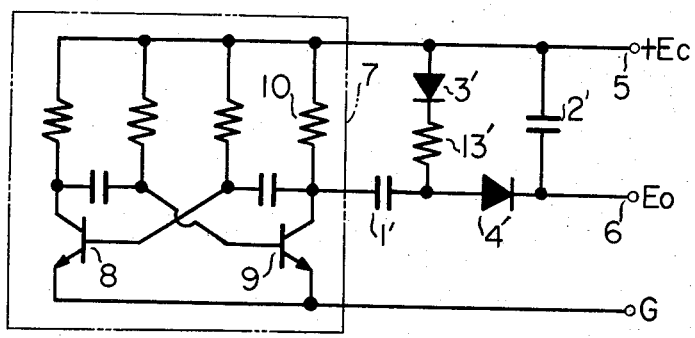
FIG. 4 is an electrical connection diagram of the third embodiment of the dc voltage supply apparatus according to this invention.

The third embodiment is shown in FIG. 4, in which numeral 1' denotes a first capacitor having a capacitance $C_1$, 2' a second capacitor having a capacitance $C_2$, 3' and 4' a first and a second diodes, and 13' a resistor.

Figure 5:
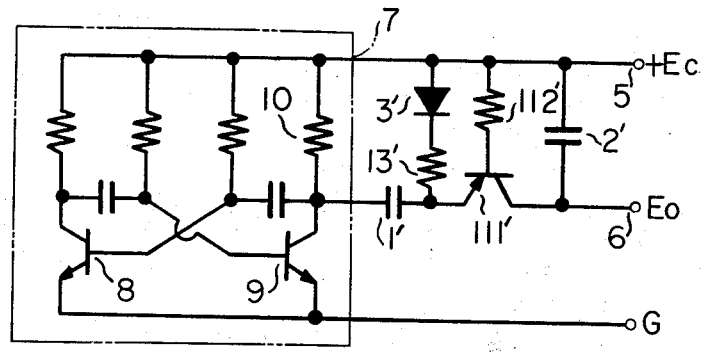
FIG. 5 is an electrical connection diagram of the fourth embodiment of the dc voltage supply apparatus according to this invention.

The operation of this embodiment of the above structure is as follows. When the astable multivibrator 7 begins self-oscillation, a square wave voltage having a peak value $E_C$ equal to that of the source voltage is generated at the collector of the transistor 9. When the transistor 9 becomes conductive and the collector voltage decreases to zero, a current is allowed to flow through the series circuit consisting of the first diode 3', the resistor 13', the first capacitor 1', and the collector-emitter of the transistor 9 and a charge of $C_1 \cdot E_C$ is stored in said first capacitor 1'. Here, the charging current for the first capacitor 1' is limited by the resistor 13'. Then, when said transistor 9 is cut off and the collector voltage increases from zero to $E_C$, there is formed the series circuit consisting of the first capacitor 1', the second diode 4', and the second capacitor 2'. Namely, a discharging circuit for the first capacitor 1' is formed through the second capacitor 2'. At this moment, the charge stored in the first capacitor 1' is directly transferred to the second capacitor 2' and across said second capacitor 2' a voltage of $+E_C$ on the output terminal 6 side is generated with respect to the terminal 5. Thus, between the output terminal 6 and the terminal G there is obtained a voltage twice as large as the source voltage. FIG. 5 shows the fourth embodiment of the present apparatus, in which the second diode 4' in said third embodiment which is a unidirectional element is replaced by a transistor 111' which is also a unidirectional element. Thus, a voltage twice as large as the source voltage is effectively obtained between the output terminal 6 and the terminal G.

Figure 3:
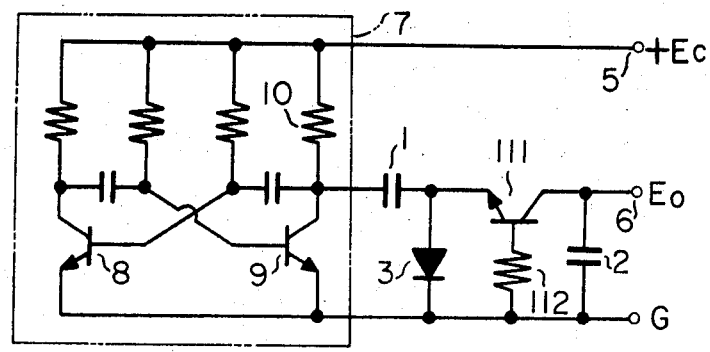
FIG. 3 is an electrical connection diagram of the second embodiment of the dc voltage supply apparatus according to this invention.
Figure 6:
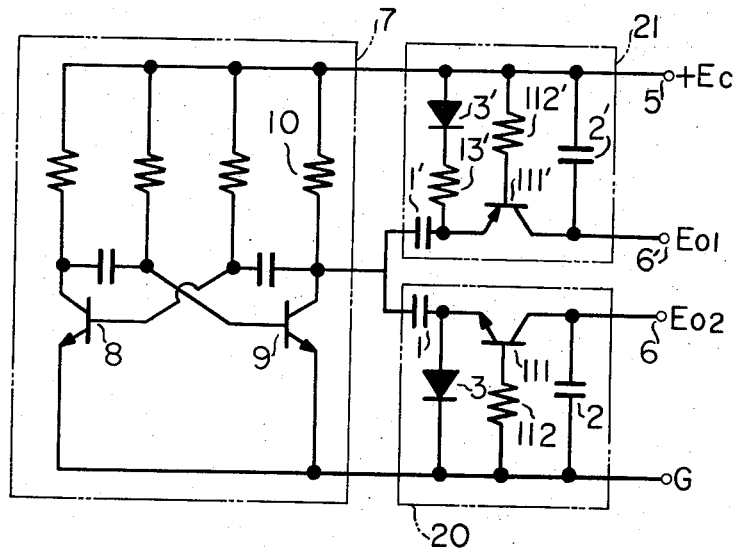
FIG. 6 is an electrical connection diagram fo the fifth embodiment of the dc voltage supply apparatus according to this invention.

The fifth embodiment of the present apparatus is shown in FIG. 6, in which in the stage following the astable multivibrator 7 the circuits of the corresponding stage in FIGS. 3 and 5 are connected in parallel. The output terminal of the former corresponding circuit 20 is shown by numeral 6 and that of the latter corresponding circuit 21 is shown by numeral 6'.

The operation of this embodiment of the above structure will be described. First, regarding the negative voltage generating circuit 20, when the astable multivibrator begins the self-oscillation, a square wave voltage having a peak value $E_C$ equal to the source voltage is generated at the collector of the transistor 9. In this state when said transistor 9 is cut off and the collector voltage increases from zero to $E_C$, a current is allowed to flow through the series circuit consisting of resistor 10, capacitor 1 and diode 3 and hence a charge of $C_1 \cdot E_C$ is stored in said capacitor 1, where $C_1$ is the capacitance of the capacitor 1. At this moment transistor 111 is cut off.

Next, when the transistor 9 becomes conductive and the collector voltage decreases to zero, a current is supplied to the base of transistor 111 through resistor 112 to turn on transistor 111. Thus, there is formed a closed circuit consisting of capacitor 1, the collector-emitter of transistor 9, capacitor 2 and the collector-emitter of transistor 111. Namely, a discharging circuit for said capacitor 1 is formed through capacitor 2. Putting the capacitance of capacitor 2 as $C_2$, there appears across capacitor 2 a voltage of $(C_1/C_1 + C_2) \cdot E_C$ with the output terminal 6 having a negative polarity which is opposite to that of the source terminal 5. Thus, between the output terminal 6 and terminal G is obtained a negative voltage having the opposite polarity to that between the source terminal 5 and terminal G.

Next, the voltage doubling generating circuit 21 will be described. When the astable multivibrator 7 begins the self-oscillation, a square wave voltage having a peak value $E_C$ equal to the source voltage is generated at the collector of transistor 9. When said transistor becomes conductive and the collector voltage becomes zero, a current is allowed to flow through the series circuit consisting of diode 3', resistor 13', capacitor 1', and the collector-emitter of transistor 9 and a charge of $C_1' \cdot E_C$ is stored in capacitor 1' where $C_1'$ is the capacitance of the capacitor 1'. Here, the charging current for said capacitor 1' is limited by resistor 13' and transistor 111' is cut off in the course of this charging.

Next, when said transistor 9 is cut off and the collector voltage rises from zero to $E_C$, a current is supplied to the base of transistor 111' through resistor 112' and transistor 111' is turned on. Thus, there is formed a series circuit consisting of capacitor 1', the emitter-collector of transistor 111', capacitor 2' and resistor 10. Namely, a discharging circuit for capacitor 1' is formed through capacitor 2'. Here, the charge stored in capacitor 1' is directly transferred to capacitor 2' and across capacitor 2' there is generated a voltage of $+E_C$ on the output terminal 6' side with respect to terminal 5. Thus, between output terminal 6' and terminal G a voltage twice as large as the source voltage is obtained.

We claim:

1. A dc voltage supply apparatus comprising a negative voltage generating circuit and a doubled voltage generating circuit, the negative voltage generating circuit comprising:

a switching element;

a series circuit of a first capacitor, an emitter collector of a first transistor, and a second capacitor, the series circuit connected in parallel to said switching element;

a first diode connected in parallel to said switching element through said first capacitor;

the first capacitor being charged up by a dc power source through said first diode when said switching element is open; and a discharging circuit for said first capacitor being formed of said switching element, said second capacitor, and the emitter-collector of said first transistor when said switching element is closed; the doubled voltage generating circuit comprising:

a series connection of a third capacitor, an emitter-collector of a second transistor, and a fourth capacitor connected between said switching element and said dc power source;

a charging circuit for said third capacitor formed of a series connection of said dc power source, a second diode, a resistor, said third capacitor and said switching element to charge up said third capacitor through said second diode, said resistor, and said switching element from said dc power source when said switching element is closed; and a discharging circuit for said third capacitor formed of the emitter-collector of said second transistor and said fourth capacitor when said switching element is open.

* * * * *